Patented Oct. 12, 1954

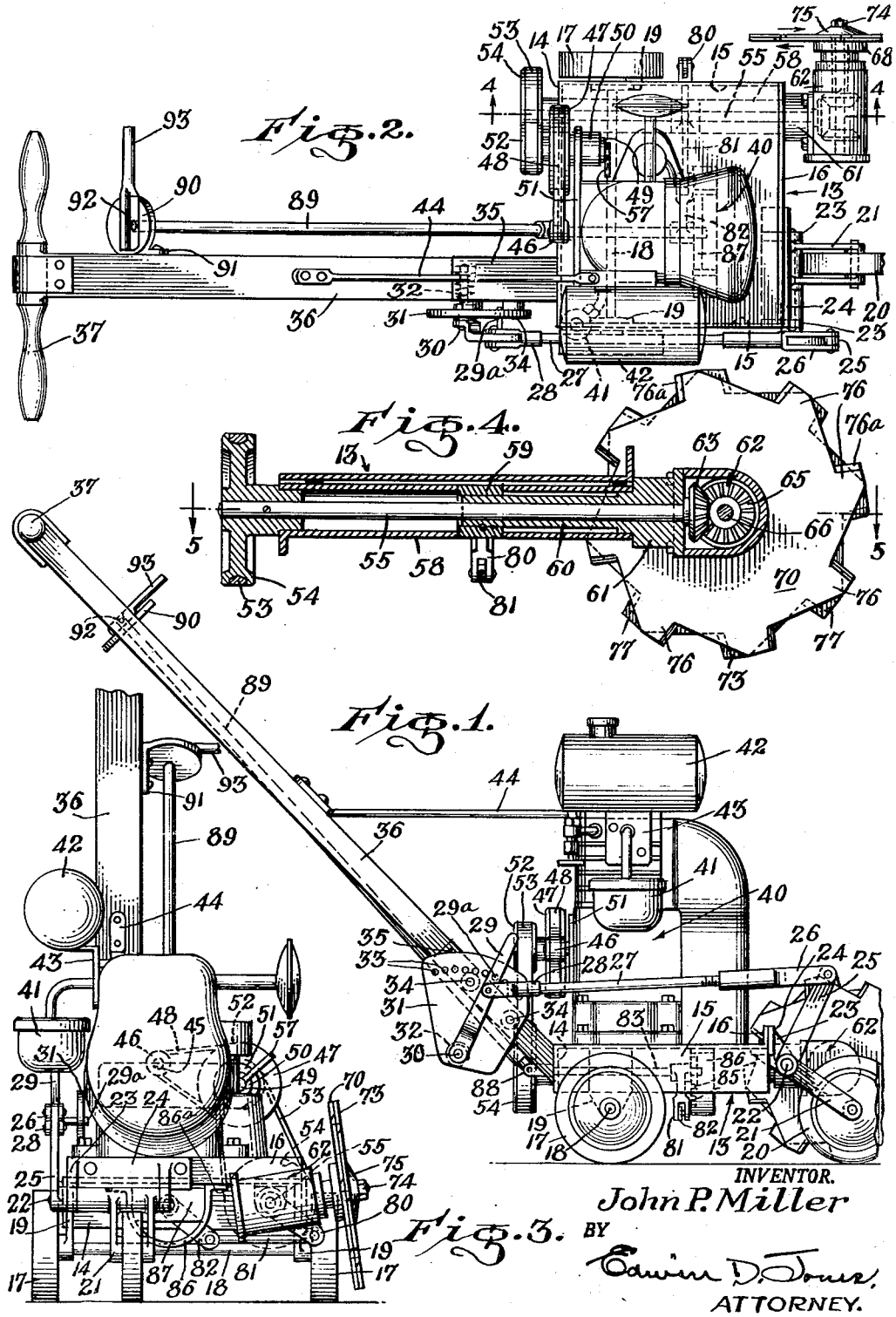

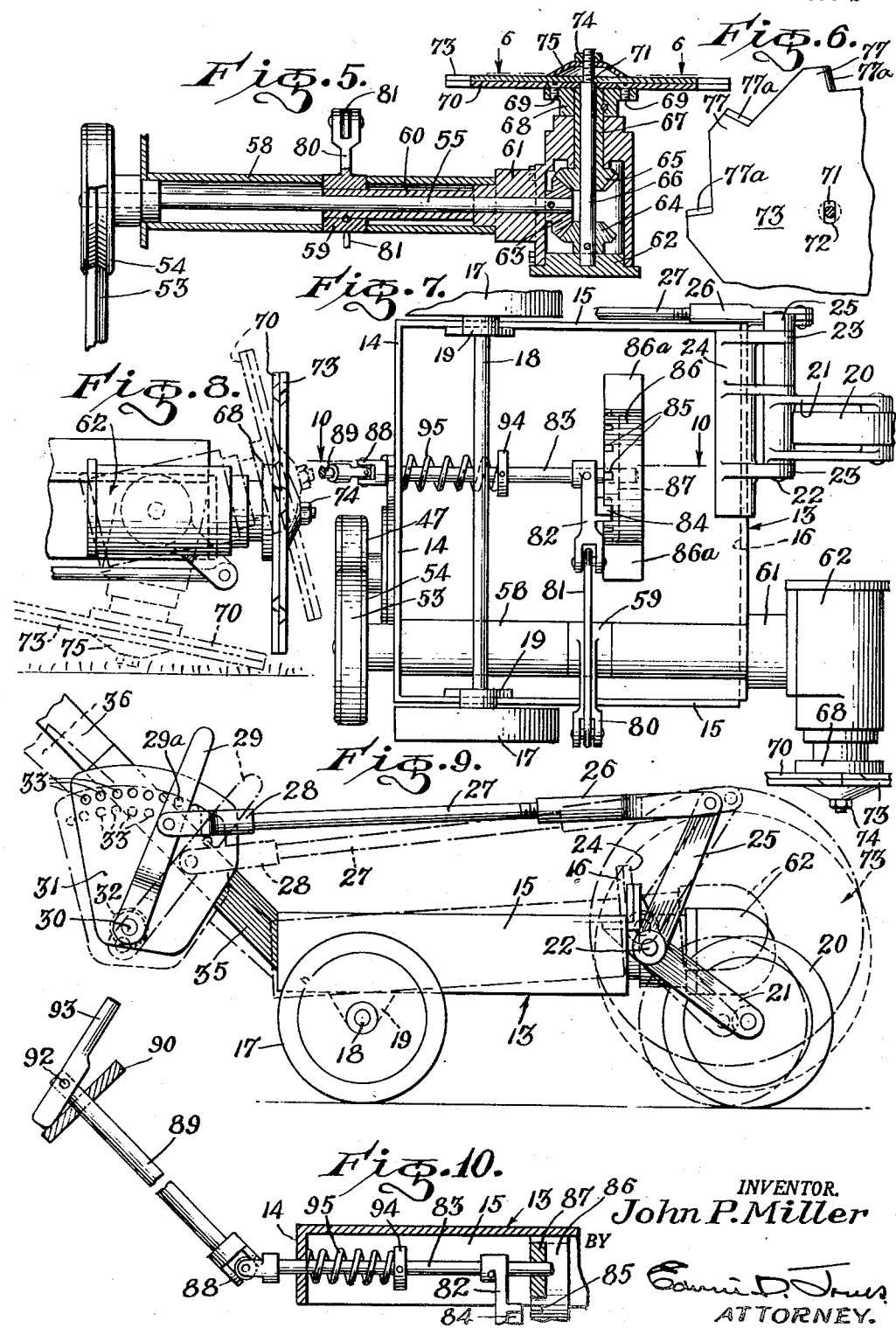

2,691,264

UNITED STATES PATENT OFFICE 2,691,264

LAWN EDGE TRIMMER

John P. Miller, Huntington Park, Calif.

Application January 28, 1952, Serial No. 268,514

2 Claims. (Cl. 56—25.4)

My invention relates to lawn edge trimmers, and it has for a purpose the provision of a trimmer which embodies a pair of rotary cutting elements each having an annular series of blades, and power operated means for positively driving the elements in opposite directions about a common axis so that the blades of one element are caused to co-act with those of the other element to cut with a shearing action grass and weeds along the edges of lawns, sidewalks and plots.

It is also a purpose of my invention to provide a lawn edge trimmer in which the cutting elements are mounted for manual adjustment to cut vertically, horizontally or at any angle therebetween even while being driven by the power operated means, and thus enabling the elements to cut along the edges of lawns and the like whether such edges are vertical or at an angle thereto, and horizontally around trees, plants or flowers without injury thereto.

A further purpose of my invention is a provision of a power operated edge trimmer which embodies a wheeled frame upon which the cutting elements and the driving means therefor are carried, so as to permit manual pushing of the trimmer over a lawn, and wherein manually operated mechanism is provided affording means for releasably locking one of the frame wheels in vertically adjusted position to effect and secure the cutting elements in various positions of vertical adjustment thus enabling the elements to cut grass along lawn edges bordering furrows of various depths, and grass around trees, plants or flowers at various heights.

Another purpose of my invention is a provision of a power operated lawn edge trimmer in which the cutting elements may be utilized not only to cut grass but to cut earth along a lawn edge to straighten such edge if so required.

I will describe only one form of lawn edge trimmer embodying my invention, and will point out the novel features in claims.

In the accompanying drawings:

Fig. 1 is a view showing in side elevation one form of lawn edge trimmer embodying my invention.

Fig. 2 is a top plan view of the trimmer.

Fig. 3 is a front end elevation of the trimmer.

Fig. 4 is an enlarged vertical sectional view taken on the line 4—4 of Fig. 2.

Fig. 5 is a horizontal sectional view taken on the line 5—5 of Fig. 4.

Fig. 6 is a fragmentary sectional view taken on the line 6—6 of Fig. 5.

Fig. 7 is an enlarged fragmentary bottom plan view of the frame of the trimmer and certain of the elements carried thereby.

Fig. 8 is an enlarged fragmentary front elevational view of the trimmer showing in broken lines the two extreme positions of adjustment of the cutting elements.

Fig. 9 is an enlarged side elevational view of the trimmer illustrating the mechanism for adjusting one of the frame wheels to, in turn, effect vertical adjustment of the frame cutting elements.

Fig. 10 is a vertical sectional view taken on the line 10—10 of Fig. 7.

Referring specifically to the drawings, my invention in its present embodiment comprises a frame 13 in the form of a square plate having a depending rear flange 14, depending side flanges 15 and an upstanding flange 16 at the forward edge thereof. This frame is supported adjacent its rear end by a pair of wheels 17 carried by an axle 18 mounted in ears 19 welded to the inner sides of the flanges 15.

The forward end of the frame 13 is supported by a front wheel 20 carried in a fork 21 fixed to a shaft 22 supported in three ears 23 on a plate 24 bolted to the flange 16. The outer end of the shaft 22 carries an arm 25 to which is pivoted a bifurcated member 26 threadedly connected to a rod 27, and the latter, in turn, threadedly connected to a second bifurcated member 28 which, in turn, is pivotally connected to a latch lever 29.

The lever 29 is fulcrumed on a bolt 30 carried by a keeper plate 31, and this lever has a pin 29a which is urged by a spring 32 on the bolt 30 into any one of a series of arcuate openings formed in the plate to releasably secure the lever in adjusted position. By means of bolts 34 the keeper plate 31 is secured to a socket 35 welded to the flange 14, and secured in the socket is a handle 36 provided at its other end with handle grips 37 by which the entire trimmer can be manually pushed over a lawn.

As will be clear from a consideration of Fig. 9, the aforedescribed mechanism provides means for adjusting the front wheel 20 vertically to raise or lower the forward end of the frame 13 for a purpose to be described hereinafter, and obviously the mechanism is manually operable through actuation of the lever 29 to move the wheel to the desired position and in which it can be releasably secured by causing the latch pin 29a to engage within one of the openings 33 where it is held by the urging action of the spring 32.

Secured on the frame 13 is a motor 40 which, in the present instance, is in the form of an internal combustion engine with the usual appurtenances for operation thereof such as a carburetor 41 and a gas tank 42. The tank is secured on a bracket 43 and to this bracket is secured the forward end of a flat rod 44, the rear end of which is bolted to the handle 36 for bracing the latter.

The engine shaft 45 has a small pulley 46 connected to a large pulley 47 by a belt 48. This pulley 47 is fixed to a shaft 49 mounted in a bearing 50 carried by a bracket 51. Also fixed to the shaft 49 is a second pulley 52 operatively connected by a belt 53 to a large pulley 54 fixed to a shaft 55. By means of a cam contained in the bearing 50 and operable by a lever 57 the shaft 49 can be raised or lowered to tighten or loosen the belts 48 and 53 and to thus operatively or inoperatively connect the engine shaft to the driven shaft 55, as will be understood.

As best shown in Figs. 4 and 5, the pulley 54 is fixed to the rear end of the shaft 55, and this shaft is partly contained in a tubular housing 58 welded to the under side of the frame 13 and divided into two sections to accommodate therebetween a collar 59 pinned to a tubular shaft 60 through which the shaft 55 extends. The shaft 60 is secured at its forward end to a bearing 61 in which the forward end of the shaft 55 is journaled, and this bearing is secured to a housing 62 into which projects the forward end of the shaft 55.

At this point the shaft 55 has pinned thereto a beveled gear 63 which constantly meshes with beveled gears 64 and 65. The gear 64 is pinned to a shaft 66 one end of which is suitably journaled in the housing 62, and the gear 65 is fixed to a tubular shaft 67 through which the shaft 66 extends. Both shafts 66 and 67 project from one end of the housing with a collar 68 pinned to the shaft 67 and secured by screws 69 to a cutting element 70. The adjacent end of the shaft 66 projects from the collar 68 where it is flattened as at 71 to fit within a correspondingly shaped opening 72 (see Fig. 6) in the center of a second cutting element 73. Beyond this flattened portion the shaft is screw threaded to receive a nut 74 for retaining a cap 75 on the shaft and in abutting relation to the element 73.

As so mounted the elements 70 and 73 are only minutely spaced from each other to allow independent rotation thereof without friction and yet prevent earth, grass and weeds from entering between the elements to cause binding of one element on the other and consequent wear of the elements.

From the preceding description of the mechanism for driving in the cutting elements 70 and 73, it becomes apparent that these elements are fixed, respectively, to the shafts 67 and 66 so that through driving of the shaft 55 by the engine the gears 63, 64 and 65 will be operated to rotate the shafts 66 and 67 in opposite directions and to thereby drive the cutting elements in opposite directions.

The cutting elements 70 and 73 are of disk form and that peripheries are provided with blades 76 and 77, respectively, having portions beveled oppositely to provide oppositely disposed cutting edges 76a and 77a which, when the disks are rotated in opposite directions, are moved in opposite directions causing them to co-act in producing a shearing cut of any grass or weeds entering between the blades.

In order to enable the cutting elements 70 and 73 to cut grass along the edges of lawns and plots, whether such edges are vertical or at an angle thereto, or to cut grass horizontally around trees, plants or flowers and without injury thereto, the cutting elements are susceptible of adjustment about the shaft 55 as a center to occupy a vertical position or a horizontal position or any angle between the two, and in fact angles slightly beyond the vertical and the horizontal, as illustrated by the broken lines in Fig. 8.

To attain these adjustments of the cutting elements the mounting of the shaft and the gear housing 62 in the tubular housing 58 allows rotatable adjustment of the housing 62 about the shaft 55 as a center thus moving the cutting elements bodily to any of the aforedescribed positions. Such adjustment of the housing 62 is attained through rotation of the tubular shaft 60 by rotation of the collar 59, and it is manifest that this housing adjustment can be accomplished even while the driving mechanism for the cutting elements is in operation.

Actuation of the collar 59 to effect rotatable adjustment of the cutting elements releasably locking the same in any position of adjustment is performed manually from a point on the handle 36 within convenient reach of the operator through the provision of the following mechanism.

As best shown in Fig. 7 an arm 80 is fixed to the collar 59 and by a link 81 pivotally connected to a latch arm 82 pinned to a shaft 83 and having a latch lug 84 engageable within any one of a series of teeth 85 on an arcuate latch keeper 86 welded at its flat ends 86a to the under side of the frame 13. The shaft 83 is journaled at one end in a bearing 87 welded to the under side of the frame 13, and it extends rearwardly through the rear flange 14 where it is connected by a universal joint 88 to the lower end of a shaft 89. This shaft 89 extends upwardly along one side of the handle 36 and through the center of a disk 90 secured to the handle by a bracket 91, and where it is pivotally connected as at 92 to a lever 93.

Again referring to Fig. 7, the shaft 83 has a collar 94 pinned thereto at a point between the latch arm 82 and the flange 14, and between this collar and flange is a coil expansible spring 95 which functions to urge the shaft 83 forwardly to maintain the latch lug 84 in engagement with the teeth 85 and to thereby secure the collar 59 in adjusted position circumferentially and, in turn, to releasably lock the cutting elements 70 and 73 in any position of adjustment. The spring in urging the shaft 83 forwardly exerts a pull downwardly on the shaft 89 to hold the lever 93 against the disk 90.

To effect a new adjustment of the cutting elements the operator pulls upwardly on the lever 93 thereby moving the shaft 83 rearwardly against the tension of the spring 95 to move the lug 84 free of the teeth 85 whereupon, the operator turns the lever 93 to rotate the shaft 83, and, hence, the collar 59 until the new adjustment of the cutting elements is attained, when the lever is released permitting the spring to return the lug into engagement with the teeth 85, and thereby locking the cutting elements in this newly adjusted position. Not only are the cutting elements 70 and 73 adjustable as described but they are capable of adjustment vertically to various levels so that they can cut grass and weeds along the edges of lawns or plots bordering furrows of various depths, and around trees, plants, or flowers at various heights. Such vertical adjustment of the cutting elements is attained through vertical adjustment of the front wheel 20 by manipulation of the lever 29 to actuate the mechanism connecting it to the wheel to swing the latter about the shaft 22 as a center.

As the wheel 20 moves upwardly or downwardly the front end of the frame 13 moves downwardly or upwardly and thus a corresponding change in elevation of the cutting elements results. Once the cutting elements are at the level required to perform a particular cutting operation they can be secured in that position by bringing the lever 29 into latching engagement with the plate 31.

It is important to note that this vertical adjustment of the cutting elements can be accomplished while they are in any position of adjustment circumferentially about the shaft 55 as a center thereby resulting in such multiple adjustments thereof as to position the elements at almost any level and angle required to perform a particular grass or weed cutting operation. While primarily designed for trimming the edges of lawns, the cutting elements can, because of the effective cutting action thereof, be employed to cut the earth along a lawn edge in a manner to straighten such edge should it be crooked.

Although I have herein shown and described only one form of lawn edge trimmer embodying my invention it is to be understood that various changes and modifications may be made herein without departing from the spirit of my invention and the spirit and scope of the appended claims.

What I claim is:

1. A lawn edge trimmer including a frame; a pair of rear wheels supporting the rear end of the frame; a front wheel; means adjacent the front of the frame for supporting the front wheel, said means having parts relatively movable to adjust the front wheel vertically and thereby adjust the front end of the frame vertically; a tubular housing fixed to the frame and extending longitudinally thereof; a tubular shaft in said housing; a gear housing fixed to said shaft and having a portion rotatably fitted in said housing and projecting beyond the forward end of said frame; a driving shaft extending through the tubular shaft and into the gear housing; a pair of driven shafts fitting one within the other in the gear housing and projecting outwardly from the housing; gears connecting the driven shafts to the driving shaft so as to be reversely rotated by the latter; a pair of coacting rotatable cutting elements fixed respectively to outer ends of the driven shafts; and manually operable means connected to the tubular shaft for rotating the same whereby adjustment of the gear housing and the cutting elements about the tubular housing as a center can be effected.

2. A lawn edge trimmer including a frame; a pair of rear wheels supporting the rear end of the frame; a front wheel; means adjacent the front of the frame for supporting the front wheel at one side of the transverse center of the frame, said means having parts relatively movable to adjust the front wheel vertically and thereby adjust the front end of the frame vertically; a tubular housing fixed to the frame at the other side of the transverse center thereof from that of the front wheel and extending longitudinally of the frame; a tubular shaft in said housing; a gear housing fixed to said shaft, said housing having a portion rotatably fitted in the tubular housing and projecting beyond the forward end of said frame; a driving shaft extending through the tubular shaft and into the gear housing; a pair of driven shafts disposed one within the other in the gear housing and projecting from one end of the gear housing; gears connecting the driven shafts with the driving shaft so as to be reversely rotated by the latter; a pair of cutting elements fixed respectively to outer ends of the driven shafts in side by side relation to each other; an arm carried by said tubular shaft and extending laterally therefrom; and mechanism connected to the said arm and operable from a point remote thereto for swinging the arm and thereby rotating the tubular shaft to effect adjustment of the gear housing and the cutting elements about the tubular housing as a center.

References Cited in the file of this patent

UNITED STATES PATENTS

| Number | Name | Date |
|---|---|---|
| 1,472,587 | Crowder | Oct. 30, 1923 |
| 2,461,188 | Stoner | Feb. 8, 1949 |
| 2,564,201 | Hainke | Aug. 14, 1951 |
| 2,568,822 | Pervis | Sept. 25, 1951 |
| 2,618,919 | Hutchens | Nov. 25, 1952 |